United States Patent
Sadow

[19]

[11] Patent Number: 5,934,425
[45] Date of Patent: Aug. 10, 1999

[54] SWING OUT HANDLE FOR WHEELED LUGGAGE

[75] Inventor: Bernard David Sadow, Chappaqua, N.Y.

[73] Assignee: Outrigger, Inc., Chappaqua, N.Y.

[21] Appl. No.: 08/800,139

[22] Filed: Feb. 13, 1997

[51] Int. Cl.[6] .............................. A45C 5/14; A45C 13/22; A45C 13/26

[52] U.S. Cl. ......................... 190/115; 190/18 A; 16/115; 280/37

[58] Field of Search ..................... 190/115, 118, 190/18 A; 16/115; 280/37, 655.1

[56] References Cited

U.S. PATENT DOCUMENTS

| 3,522,955 | 8/1970 | Warner, Jr. | 16/115 X |
|---|---|---|---|
| 3,895,696 | 7/1975 | Urushibara | 190/115 X |
| 4,036,336 | 7/1977 | Burtley | 190/115 X |
| 4,261,447 | 4/1981 | Arias et al. | 190/18 A |
| 5,005,255 | 4/1991 | Pare et al. | 16/115 |
| 5,075,925 | 12/1991 | Maloney | 190/115 X |
| 5,197,578 | 3/1993 | Van Hooreweder | 190/18 A |
| 5,249,438 | 10/1993 | Rhaney et al. | 190/115 X |
| 5,377,795 | 1/1995 | Berman | 190/18 A |
| 5,497,865 | 3/1996 | Yun-Pi | 16/115 X |
| 5,511,806 | 4/1996 | McNair | 190/18 A X |
| 5,553,692 | 9/1996 | Sheiman | 190/115 X |
| 5,564,538 | 10/1996 | Sadow | 190/18 A |
| 5,573,089 | 11/1996 | Liang | 190/115 X |
| 5,575,362 | 11/1996 | Franklin et al. | 190/115 |

FOREIGN PATENT DOCUMENTS

| 3636064 | 4/1988 | Germany | 190/115 |
|---|---|---|---|
| 2111465 | 7/1983 | United Kingdom | 190/115 |
| 2270900 | 3/1994 | United Kingdom | 190/115 |

*Primary Examiner*—Sue A. Weaver
*Attorney, Agent, or Firm*—Abelman, Frayne & Schwab

[57] ABSTRACT

A handle structure for wheeled luggage comprises a U-shaped telescoping handle and one or two swing out handles pivotably attached to the U-shaped telescoping handle. The wheeled luggage can be pushed or pulled in a first set of two collinear directions by the U-shaped telescoping handle and can be pushed or pulled in a second set of two collinear directions by the one or two swing out handles. The first set of two collinear directions in which the wheeled luggage can be propelled by the one or two swing out handles are parallel to a first line which is perpendicular to a second line which is parallel to the second set of two collinear directions.

30 Claims, 7 Drawing Sheets

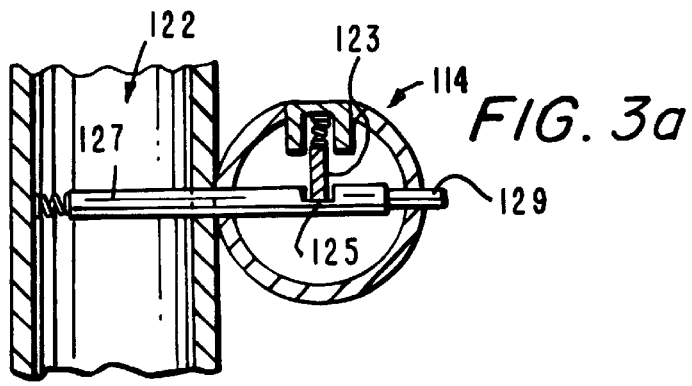
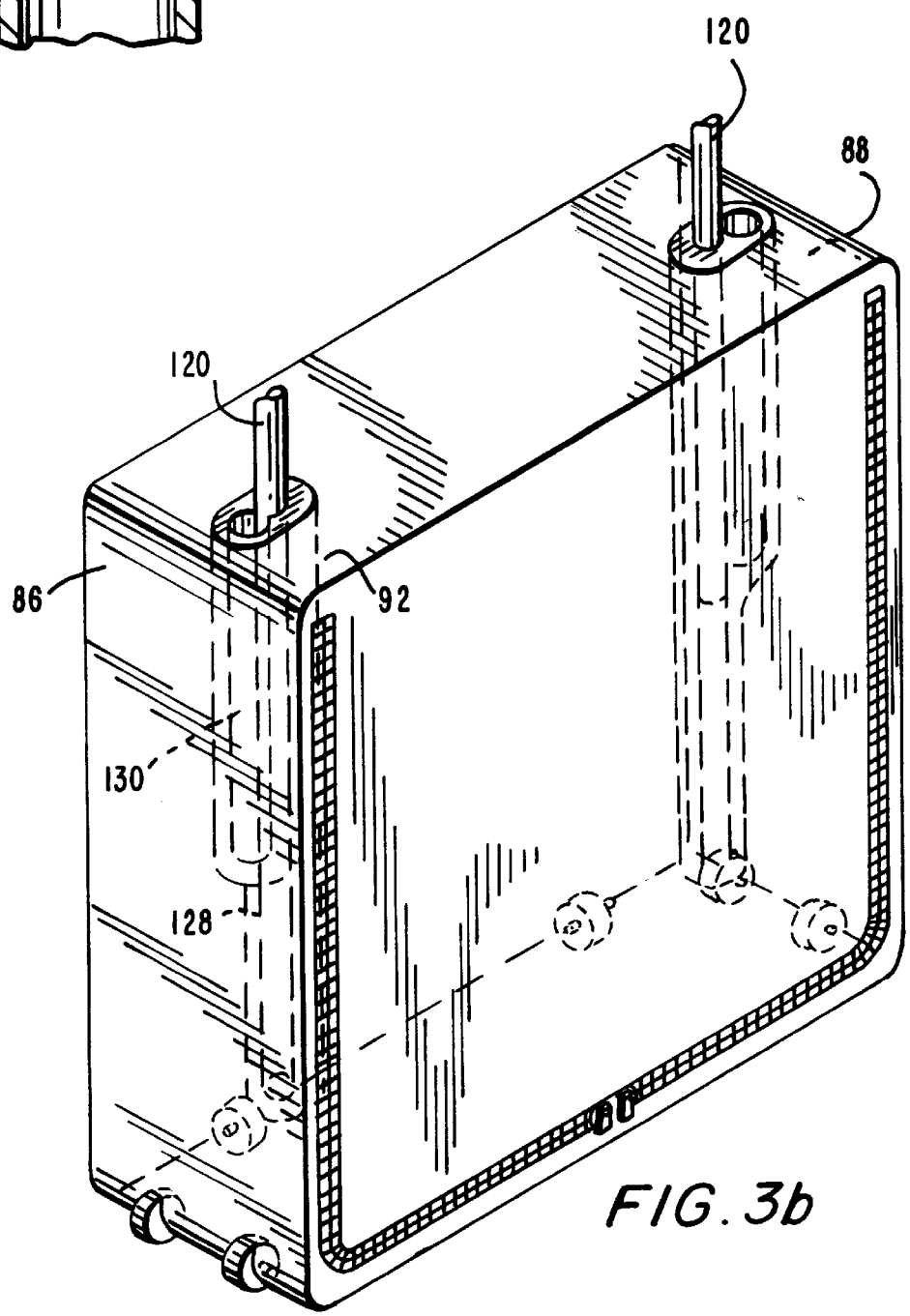

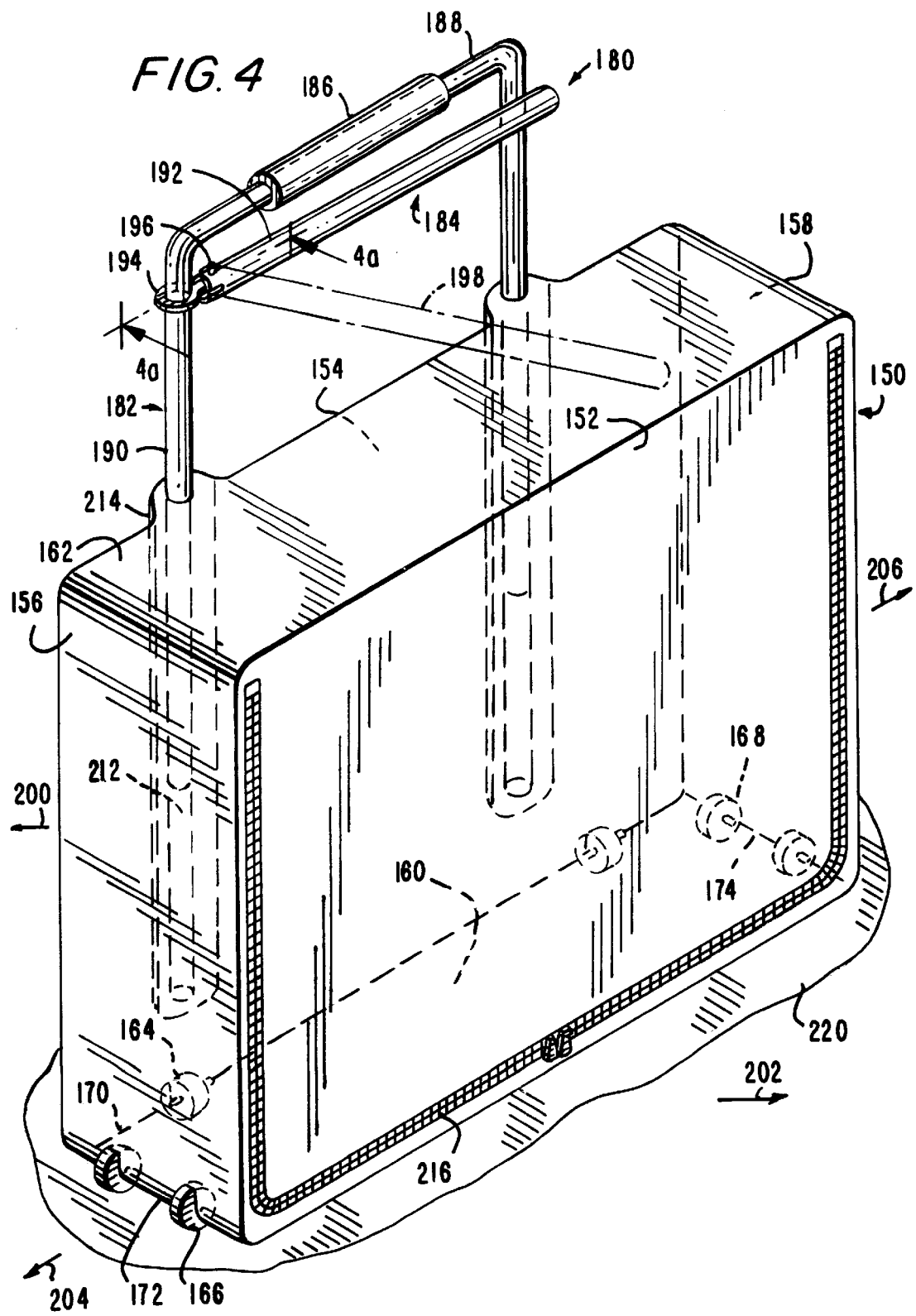

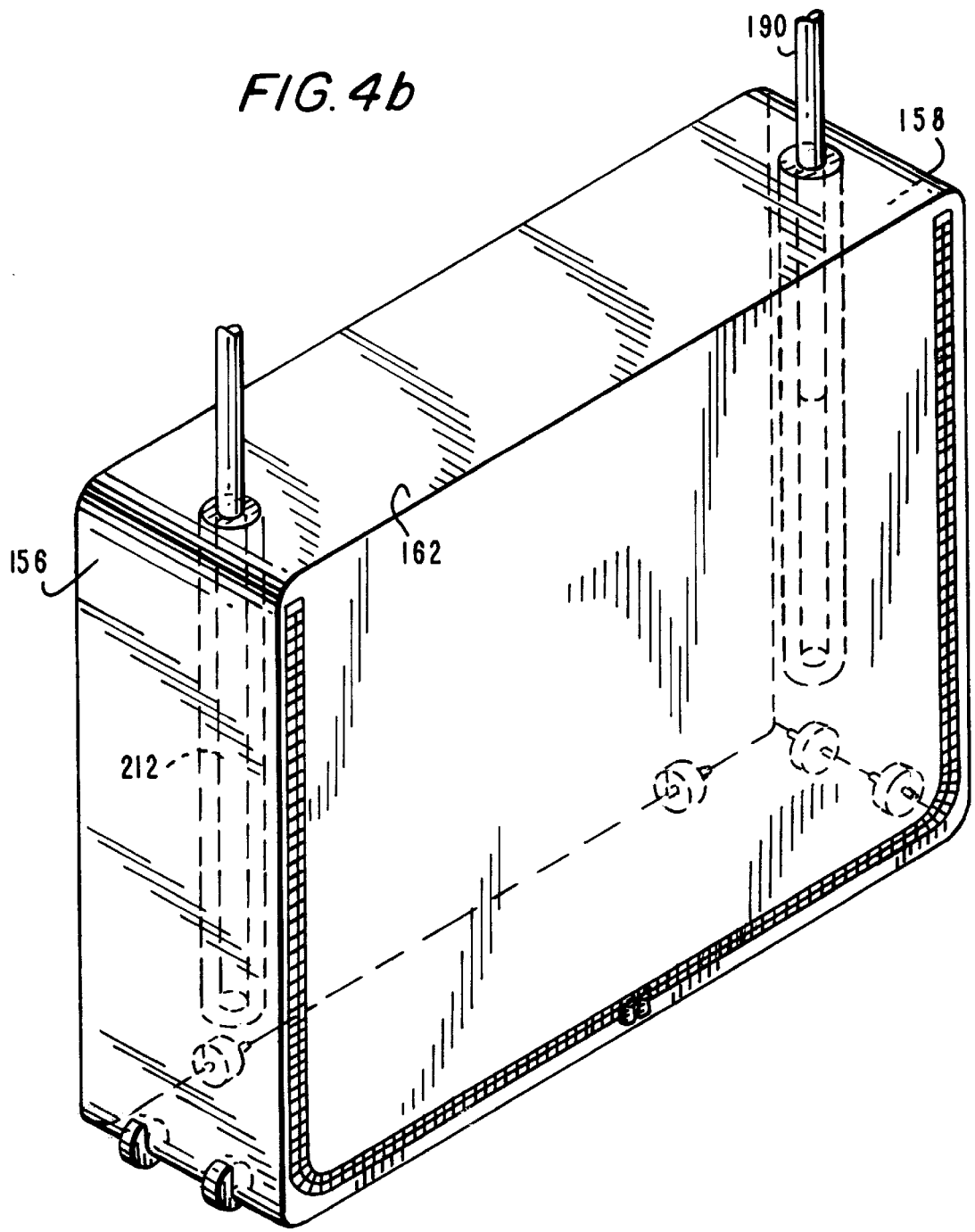

SWING OUT HANDLE FOR WHEELED LUGGAGE

BACKGROUND OF THE INVENTION

1. Field of the Invention

This invention relates to luggage that may be wheeled in the four directions parallel to the front, rear, and two side walls of the luggage and, in particular, to handles attached to such luggage to effect such wheeling.

2. Description of the Related Art

Luggage of a generally parallelepiped shape has six walls, namely, a top wall, bottom wall, front wall, rear wall, and two side walls, and may have wheels or other rolling members placed on the bottom wall of the luggage to permit wheeling the luggage in four directions parallel to the front, rear, and two side walls of the luggage. However, the handle or other grasping means attached to the luggage and used to wheel the luggage in any one of the four directions is typically not equally well adapted to move the luggage in all four directions or, if it is so adapted, is not particularly effective for some of the directions or employs more than one handle or other grasping means.

Van Hooreweder, U.S. Pat. No. 5,197,578, for example, has four wheels attached to a face of luggage opposite a handle for moving the luggage by use of the four wheels. Three of the wheels are mounted in casters capable of swiveling about an axis perpendicular to the face of the luggage on which the wheels are attached. The fourth wheel is mounted in a fixed caster restricting rotation of this wheel to produce movement in a direction parallel to the longer dimension of the face of the luggage on which the wheels are attached. The luggage is capable, therefore, of moving in either of the two directions parallel to the longer dimension of the face of the luggage on which the wheels are attached, but is only stated to move in one of the two directions parallel to the shorter dimension of the face of the luggage by tipping the luggage to an angle to its normally vertical position so that only the two wheels in swiveling casters remain in contact with the surface upon which the luggage is supported and pulling the handle used for moving the luggage (column 2, lines 59–66). Moreover, the handle used for moving the luggage over the wheels is of conventional construction allowing limited gripping area and, therefore, limited flexibility and effectiveness in applying the force necessary to move the luggage using the wheels.

Berman, U.S. Pat. No. 5,377,795, discloses luggage with four wheels attached to the bottom wall. Two of the wheels are mounted in fixed casters which are arranged at opposite ends of one of the longer sides of the bottom wall so as to rotate and cause motion of the luggage in either direction parallel to the longer dimension of the bottom wall. The remaining two wheels are mounted in casters arranged at opposite ends of the other of the longer sides of the bottom wall and are capable of swiveling so that the wheels can rotate through 360 degrees. This allows the remaining two wheels to be placed in positions perpendicular to the wheels in the fixed casters so as to allow motion of the luggage in one direction parallel to the shorter dimensions of the bottom wall when the luggage is placed at an angle to its normally vertical orientation, thus lifting the fixed casters and wheels in them from contact with the surface on which the luggage is supported. The user produces the motion of the luggage over the wheels by grasping a telescopic U-shaped handle which extends from the top wall of the luggage, but is located at and extends parallel to the side of the top wall corresponding to the side of the bottom wall on which the swiveling casters are located. The luggage can be rolled in either of the two directions parallel to the longer dimension of the bottom wall by simply applying force in the selected direction to the telescopic U-shaped handle. In addition, the luggage can be pulled in a direction parallel to the shorter dimension of the bottom wall by tipping the luggage out of its normal vertical orientation so that the two wheels contained in the swiveling casters are in contact with the surface supporting the luggage, but the two wheels contained in the fixed casters are not in contact with the surface supporting the luggage. The handle is effective in producing motion in the direction parallel to the shorter dimension of the bottom wall since it is perpendicular to the direction of motion, but is not very efficient in producing motion parallel to the longer dimension of the bottom wall since it is parallel to the direction of motion and is not centrally located with respect to the shorter dimension of the bottom wall.

The luggage in McNair, U.S. Pat. No. 5,511,806, approaches the problem of making luggage movable in a different way than the references previously mentioned. Instead of relying on wheels that allow the luggage to remain in the vertical position for at least some directions of movement, McNair describes a wheel arrangement that requires tipping the luggage from the vertical position so that some of the wheels lose contact with the surface supporting the luggage in the vertical orientation in order for the luggage to be rolled in any direction.

The main embodiment in the invention has two sets of two rigidly fixed wheels. One set of wheels is fixed to opposite ends of one of the longer edges of the bottom wall and arranged so that the axis of rotation of the wheels is parallel to the longer edges of the bottom wall. The other set of wheels is fixed to opposite ends of one of the shorter edges of the bottom wall of the luggage and arranged so that the axis of rotation of the wheels is parallel to the shorter edges of the bottom wall. Two handles are attached to the luggage either telescoping from the top wall or folding flush against it when not in use. One handle is located along a longer edge of the top wall and one handle is located along a shorter edge of the top wall.

To produce movement of the luggage in the direction parallel to the shorter dimension of the top wall, the handle along the longer edge of the top wall is used to tip the luggage so that only the wheels along the long edge of the bottom wall contact the surface and the luggage may then be rolled along using these wheels. Similarly, to produce movement of the luggage in the direction parallel to the longer dimension of the top wall, the handle along the shorter edge of the top wall is used to tip the luggage so that only the wheels along the short edge of the bottom wall contact the surface and the luggage may then be rolled along using these wheels.

An alternate embodiment only differs from that above in that the two of the wheels, which are closest to each other, on the intersecting edges of the bottom wall are replaced by a single swiveling caster, in which is mounted a wheel, at the intersection of the two edges of the bottom wall on which the two remaining fixed wheels are located.

This invention allows for more effective control over travel in the mutually perpendicular directions parallel to the longer and shorter dimensions of the top wall by providing for two handles situated as they are, but the disadvantage of the necessity for two handles remains.

A case disclosed in Sadow, U.S. Pat. No. 5,564,538, provides for movement of the case in two directions perpendicular to the shorter dimension of the bottom wall and two directions perpendicular to the longer dimension of the bottom wall. This is effected through the presence of a pair of wheels on each of the shorter edges of the bottom wall and on one of the longer edges of the bottom wall. A retractable handle that projects from the interior of the top wall of the case and that is rotatable through an angle of 90 degrees so that the grip of the handle is either parallel to the longer dimension of the bottom wall or the shorter dimension of the bottom wall allows the user to propel the case in any one of the aforesaid four directions by first angling the case from the vertical so that its weight rests on the set of wheels whose axis of rotation is perpendicular to the direction of travel desired.

Although only one handle is thus required for control of the case, the single relatively short horizontal bar interrupted by the handle shaft which serves as the grip may not be comfortable for the user or very effective in exerting the force necessary to control the case in difficult situations where the surface to be traversed becomes irregular, greatly inclined, or otherwise challenging. The alternative embodiment of the towing handle shown in FIG. 3 of Sadow is a conventional U-shaped telescopic handle well known in the art, but since it is aligned parallel to the longer dimension of the bottom wall, it will not be very effective in enabling the user to control the travel of the case when it is desired to move the case in a direction parallel to the longer dimension of the bottom wall.

SUMMARY OF THE INVENTION

The invention comprises a handle structure which facilitates towing of wheeled luggage in a first and second direction which are perpendicular to the longer dimension of the bottom wall of the luggage and in a third and fourth direction which are perpendicular to the shorter dimension of the bottom wall of the luggage.

The handle structure, in a first embodiment of the invention, comprises a conventional U-shaped telescoping handle located along a longer edge of the top wall of the luggage with another U-shaped member attached to the handle such that the legs of the U are attached to the legs of handle and the top of the U-shaped member spans the space between the legs of the handle. The legs of the U-shaped member can be swung through an angle of 90 degrees to a horizontal position in which the legs are perpendicular to the longer dimension of the top wall and span the top wall along its shorter dimension. In this position, the U-shaped member functions to enable the user to move the luggage in the third and fourth direction with a degree of efficiency and control similar to that achieved with the use of the conventional U-shaped telescoping handle in moving the luggage in the first and second direction.

In a second embodiment of the invention, the U-shaped conventional telescoping handle is centrally located with respect to the shorter dimension of the top wall and two rotatable legs perform an analogous function to that of the U-shaped member described in the first embodiment. Each of the legs is located on one of the legs of the U-shaped telescoping handle and is pivotably attached thereto such that it rotates 90 degrees into a horizontal position with the length of each portion of the leg on one side of the pivot point being substantially equal.

A third embodiment of the invention differs from the first embodiment of the invention in the handle structure. The handle structure comprises a linear member pivotably attached to one leg of a conventional U-shaped telescoping handle located along a longer edge of the top wall of the luggage. The linear member is parallel to and below the horizontal portion of the U-shaped telescoping handle spanning between the legs of the U-shaped telescoping handle. The linear member is in a position such that its free end touches one of the legs of the U-shaped telescoping handle when the linear member is not being used to propel the luggage. The user can rotate the linear member through an angle of substantially 90 degrees so that the linear member is parallel to the shorter dimension of the bottom wall of the luggage and perpendicular to the third and fourth direction. In this position, the user can use the linear member to propel the luggage in the third and fourth direction.

An object of the invention is to provide a means to allow the user to effectively control the motion of wheeled luggage in a first and second direction which are perpendicular to the longer dimension of the bottom wall of the luggage and in a third and fourth direction which are perpendicular to the shorter dimension of the bottom wall of the luggage.

A further object of the invention is to arrange the aforesaid means in such a manner that it can be compactly stored when not in use.

A still further object of the invention is to design the aforesaid means in such a manner that the effective gripping area provided by such means is maximized.

These and other objects and advantages of the present invention will become more apparent to those of ordinary skill in the art upon consideration of the attached drawings and the following description of the preferred embodiments which are meant by way of illustration and example only, but are not to be construed as in any way limiting the invention disclosed and claimed herein.

BRIEF DESCRIPTION OF THE DRAWINGS

FIG. 1a is a cross-sectional view of a pivot and locking mechanism taken along section lines 1a—1a in FIG. 1.

FIG. 3a is a cross-sectional view of a pivot and locking mechanism take along section lines 3a—3a in FIG. 3.

FIG. 3b is a simplified, partial perspective view of the second embodiment of the invention, with the guide tubes for the handle structure penetrating the interior of the luggage.

FIG. 4 is a perspective view of the third embodiment of the invention with the swing out handle in the horizontal position substantially parallel to the longer dimension of the bottom wall of the luggage.

FIG. 4b is a simplified, partial perspective view of the third embodiment of the invention, with the guide tubes for the handle structure penetrating the interior of the luggage.

FIG. 4c is an enlarged cross-sectional view taken along section lines 4c—4c in FIG. 4a.

DESCRIPTION OF THE PREFERRED EMBODIMENTS

For a more detailed description of the invention in its several embodiments, given only by way of example and not to be construed as limiting the invention in any fashion, we refer to the drawings.

Figure 1:
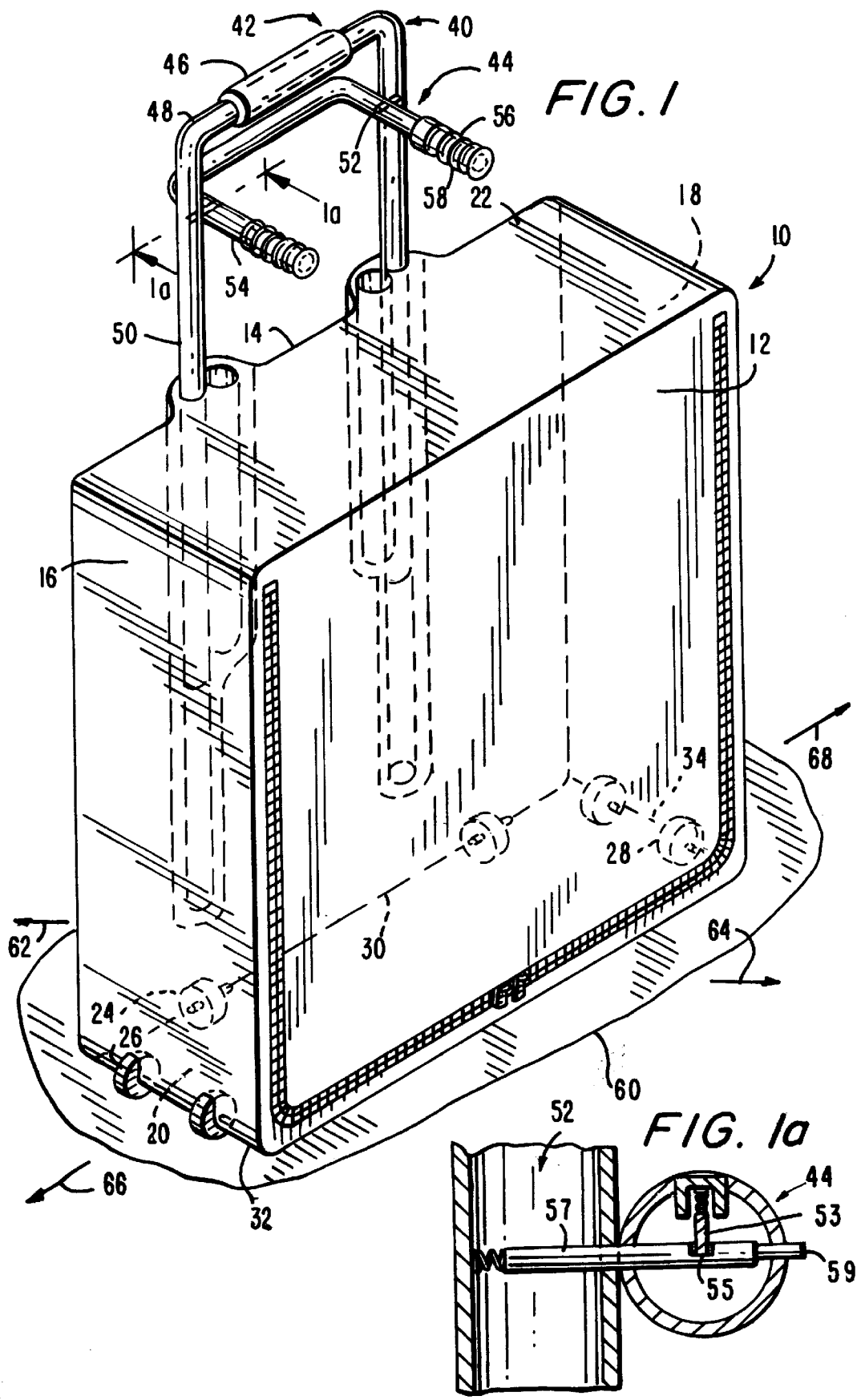
FIG. 1 is a perspective view of the first embodiment of the invention with the swing out handle in the horizontal position.

In FIG. 1, a piece of wheeled luggage 10 of a generally parallelepiped shape is shown equipped with a swing out handle structure 40 in accordance with a first embodiment of the invention. The wheeled luggage has a front wall 12, a rear wall 14, a front side wall 16, a rear side wall 18, a bottom wall 20, and a top wall 22, all walls being rectangular in shape. The bottom wall 20 has six wheels attached to three of its four edges. Each of a first pair of wheels 24 is fixedly attached to opposite sides of the edge 30 between the rear wall 14 and the bottom wall 20. Each of a second pair of wheels 26 is fixedly attached to opposite sides of the edge 32 between the front side wall 16 and the bottom wall 20. Finally, each of a third pair of wheels 28 is fixedly attached to opposite ends of the edge 34 between the rear side wall 18 and the bottom wall 20. When the wheeled luggage is at rest in a vertical orientation as shown in FIG. 1, the first pair of wheels 24, the second pair of wheels 26, and the third pair of wheels 28 are in contact with a surface 60.

The handle structure 40 is comprised of a conventional U-shaped telescoping handle 42 well-known in the art and a swing out handle 44. The U-shaped telescoping handle has a padded grip 46 located on the spanning portion 48 of the U-shaped telescoping handle 42 for grasping by a user in extending and contracting the U-shaped telescoping handle 42 and in propelling the wheeled luggage 10 in selected directions. The swing out handle 44 is shown in its substantially horizontal operating position, perpendicular to the twin legs 50 of the U-shaped telescoping handle 42. The swing out handle 44 is attached to both legs 50 of the U-shaped telescoping handle 42 by pivot and locking mechanisms 52 running through the legs 50 of the U-shaped telescoping handle 42 and the legs 54 of the swing out handle 44. The pivot and locking mechanisms 52 allow rotation of the swing out handle 44 from a substantially vertical position (see FIG. 2) to the horizontal operating position shown in FIG. 1. The pivot and locking mechanisms 52, (see FIG. 1a), produce a locking effect when the swing out handle 44 is in the substantially vertical position and the horizontal position by, for example, a spring-actuated tongue 53 and grooves 55, the grooves 55 lying in a pin 57 which permits the pivoting needed, or by other conventional means well known in the art. The locked swing out handle 44 can be released by the user by, for example, pushing a button 59 on the swing out handle 44 disengaging the tongue 53 from one of the grooves 55 or by other conventional means well known in the art. Alternatively, the pivot and locking mechanism 52 may be replaced by a pin alone permitting the pivoting needed, but offering sufficient resistance to pivoting to render any locking mechanism unnecessary. The swing out handle 44 has grips 56 on the end of each leg 54 for the user to grasp and thereby propel the wheeled luggage 10 in selected directions. The grips 56 preferably have finger grooves 58 on their surface to enable the user to obtain a tighter grasp and thereby exert greater force on the wheeled luggage.

In operation, the user can exert a downward force on the padded grip 46 and tip the wheeled luggage 10 so that only the first pair of wheels 24 remain in contact with the surface 60. In this angled position, the wheeled luggage can be pulled in a first direction 62 or pushed in a second direction 64, assuming that the user is standing on the same side of the wheeled luggage 10 as the rear wall 14. Both the first direction 62 and the second direction 64 are perpendicular to the longer dimension of the bottom wall 20 of the wheeled luggage 10. To propel the wheeled luggage 10 in either a third direction 66 or a fourth direction 68, the user may exert a downward force on either one of the grips 56, thereby tipping the wheeled luggage so that either only the second pair of wheels 26 or only the third pair of wheels 28 remains in contact with the surface 60. The user may then push or pull the wheeled luggage 10 in the third direction 66 and push or pull the wheeled luggage 10 in the fourth direction 68, depending on whether the user is standing on the same side of the wheeled luggage 10 as the front side wall 16 or the rear side wall 18. Both the third direction 66 and the fourth direction 68 are perpendicular to the shorter dimension of the bottom wall 20 of the wheeled luggage 10.

Figure 2:
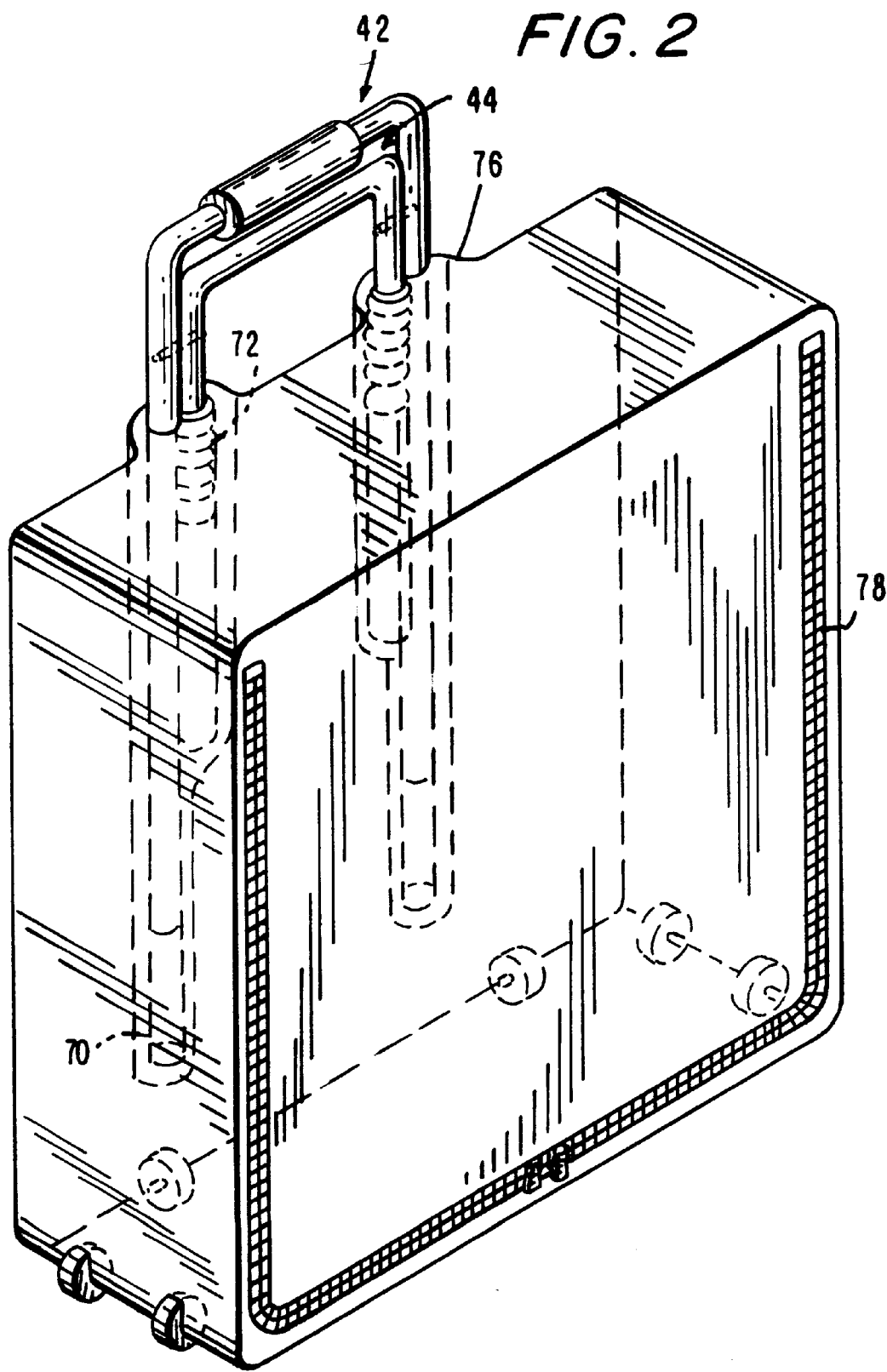
FIG. 2 is a perspective view of the first embodiment of the invention with the swing out handle in the vertical position.

FIG. 2 shows the swing out handle 44 in a vertical orientation appropriate so that the user may push both the U-shaped telescoping handle 42 and the swing out handle 44 down to their minimum length projecting from the wheeled luggage 10. Telescoping handle guide tubes 70 hold the legs 50 of the U-shaped telescoping handle when the handle is fully retracted and guide and hold them upon extension. Likewise, swing out handle guide tubes 72 hold the legs 54 of the swing out handle 44 when the handle is fully retracted and guide and hold them during a portion of the extension process. Each pair of swing out handle guide tube 72 and telescoping handle guide tube 70 is contained within a molding 76 preferably integrally formed with the rear wall 14 of the wheeled luggage 10. The front wall 12 of the wheeled luggage 10 is flexible and substantially removable by means of the zipper mechanism 78 running around three of its four edges. The remaining walls of the wheeled luggage are rigid to provide needed strength for the weight of the contents, for forces exerted on the wheeled luggage 10 during wheeling, and for support of the moldings 76 and of both the U-shaped telescoping handle 42 and the swing out handle 44 contained therein.

Figure 3:
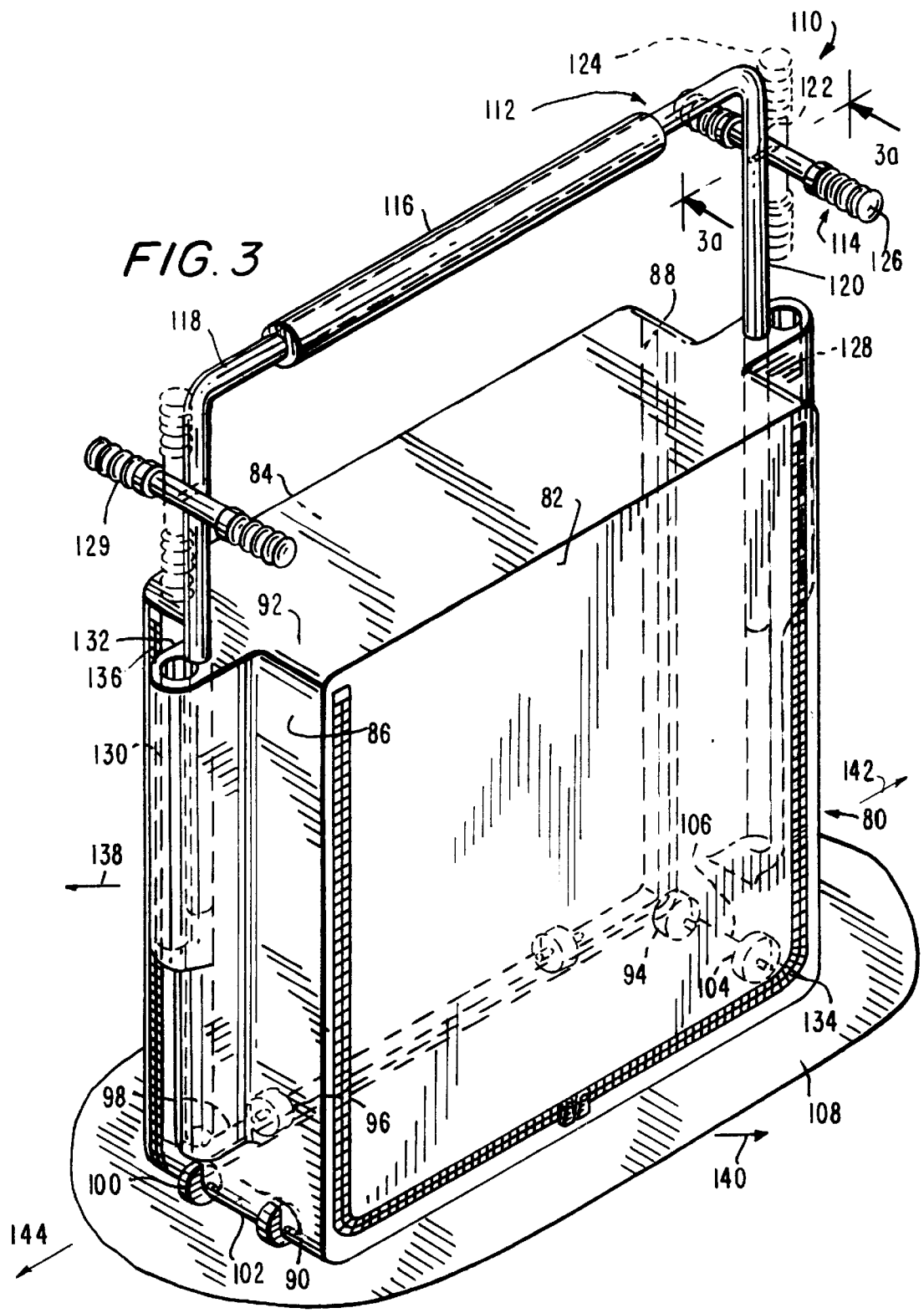
FIG. 3 is a perspective view of the second embodiment of the invention with the swing out handle in the horizontal position.

FIG. 3 shows a second embodiment of the invention. The wheeled luggage 80, as before, has a front wall 82, a rear wall 84, a front side wall 86, a rear side wall 88, a bottom wall 90, and a top wall 92, all walls being rectangular in shape. The bottom wall 90 has six wheels attached to it by fixed casters 94. Each of a first pair of wheels 96 is attached to opposite sides of the bottom wall 90 adjacent to and along the edge 98 between the rear wall 84 and the bottom wall 90. Each of a second pair of wheels 100 is attached to opposite sides of the bottom wall 90 adjacent to and along the edge 102 between the front side wall 86 and the bottom wall 90. Finally, each of a third pair of wheels 104 is attached to opposite sides of the bottom wall 90 adjacent to and along the edge 106 between the rear side wall 88 and the bottom wall 90. When the wheeled luggage 80 is at rest in a vertical orientation as shown in FIG. 3, the first pair of wheels 96, the second pair of wheels 100, and the third pair of wheels 104 are in contact with a surface 108.

The handle structure 110 is comprised of a conventional U-shaped telescoping handle 112 well-known in the art and two swing out handles 114. The U-shaped telescoping handle 112 has a padded grip 116 located on the spanning portion 118 of the U-shaped telescoping handle 112 for grasping by a user in extending and contracting the U-shaped telescoping handle 112 and in propelling the wheeled luggage 80 in selected directions. The swing out handles 114 are shown in their substantially horizontal operating positions in solid lines, perpendicular to the twin legs 120 of the U-shaped telescoping handle 112. Each swing out handle 114 is attached to one of the legs 120 of the U-shaped telescoping handle 112 by a pivot and locking mechanism 122 running through a leg 120 of the U-shaped telescoping handle 112 and the swing out handle 114. The pivot and locking mechanism 122 allows rotation of each swing out handle 114 from a substantially vertical position, shown in dotted lines on FIG. 3, 124, to the horizontal operating position shown in solid lines in FIG. 3. The pivot and locking mechanism 122, (see FIG. 3a), produces a locking effect when the swing out handle 114 is in the substantially vertical position and the horizontal position by, for example, a spring-actuated tongue 123 and grooves 125, the grooves 125 lying in a pin 127 which permits the pivoting needed, or by other conventional means well known in the art. Each locked swing out handle 114 can be released by the user by, for example, user pushing a button 129 on the swing out handle 114, thus disengaging the tongue 123 from one of the grooves 125, or by other conventional means well known in the art. Alternatively, the pivot and locking mechanism 122 may be replaced by a pin alone permitting the pivoting needed, but offering sufficient resistance to pivoting to render any locking mechanism unnecessary. Each swing out handle 114 has grips 126 on each end for the user to grasp and thereby propel the wheeled luggage 80 in selected directions. The grips 126 preferably have finger grooves 129 on their surface to enable the user to obtain a tighter grasp and thereby exert greater force on the wheeled luggage.

When each swing out handle 114 is in a vertical orientation 124, the user may push both the U-shaped telescoping handle 112 and both swing out handles 114 down to their minimum length projecting from the wheeled luggage 80. Telescoping handle guide tubes 128 hold the legs 120 of the U-shaped telescoping handle 112 when the handle is fully retracted and guide and hold them upon extension. Likewise, each swing out handle guide tube 130 holds each swing out handle 114 when the handle is fully retracted and guides and holds them during a portion of the extension process. Each pair of swing out handle guide tube 130 and telescoping handle guide tube 128 is contained within a molding 132 preferably integrally formed with either the front side wall 86 or the rear side wall 88 of the wheeled luggage 80 as shown in FIG. 3. The front wall 82 of the wheeled luggage 80 is flexible and substantially removable by means of the zipper mechanism 134 running around three of its four edges. Likewise, the rear wall 84 of the wheeled luggage 80 is flexible and removable by means of the zipper mechanism 136 running along the front side wall 86, the bottom wall 90, and the rear side wall 88, and adjacent to three of the four edges of the rear wall 84. The remaining walls of the wheeled luggage are rigid to provide needed strength for the weight of the contents, for forces exerted on the wheeled luggage 80 during wheeling, and for support of the moldings 132 and of both the U-shaped telescoping handle 112 and the swing out handles 114 contained therein.

In operation, the user can exert a downward force on the padded grip 116 and tip the wheeled luggage 80 so only the first pair of wheels 96 remain in contact with the surface 108. In this angled position, the wheeled luggage can be pulled in a first direction 138 or pushed in a second direction 140, assuming that the user is standing on the same side of the wheeled luggage 80 as the rear wall 84. Both the first direction 138 and the second direction 140 are perpendicular to the longer dimension of the bottom wall 90 of the wheeled luggage 80. To propel the wheeled luggage 80 in either a third direction 142 or a fourth direction 144, the user may exert a downward force on either one or both of the grips 126 of either one of the swing out handles 114, thereby tipping the wheeled luggage 80 so that either only the second pair of wheels 100 or only the third pair of wheels 104 remains in contact with the surface 108. The user may then push or pull the wheeled luggage 80 in the third direction 142 and push or pull the wheeled luggage 80 in the fourth direction 144, depending on whether the user is standing on the same side of the wheeled luggage 80 as the front side wall 86 or the rear side wall 88. Both the third direction 142 and the fourth direction 144 are perpendicular to the shorter dimension of the bottom wall 90 of the wheeled luggage 80.

Figure 4A:
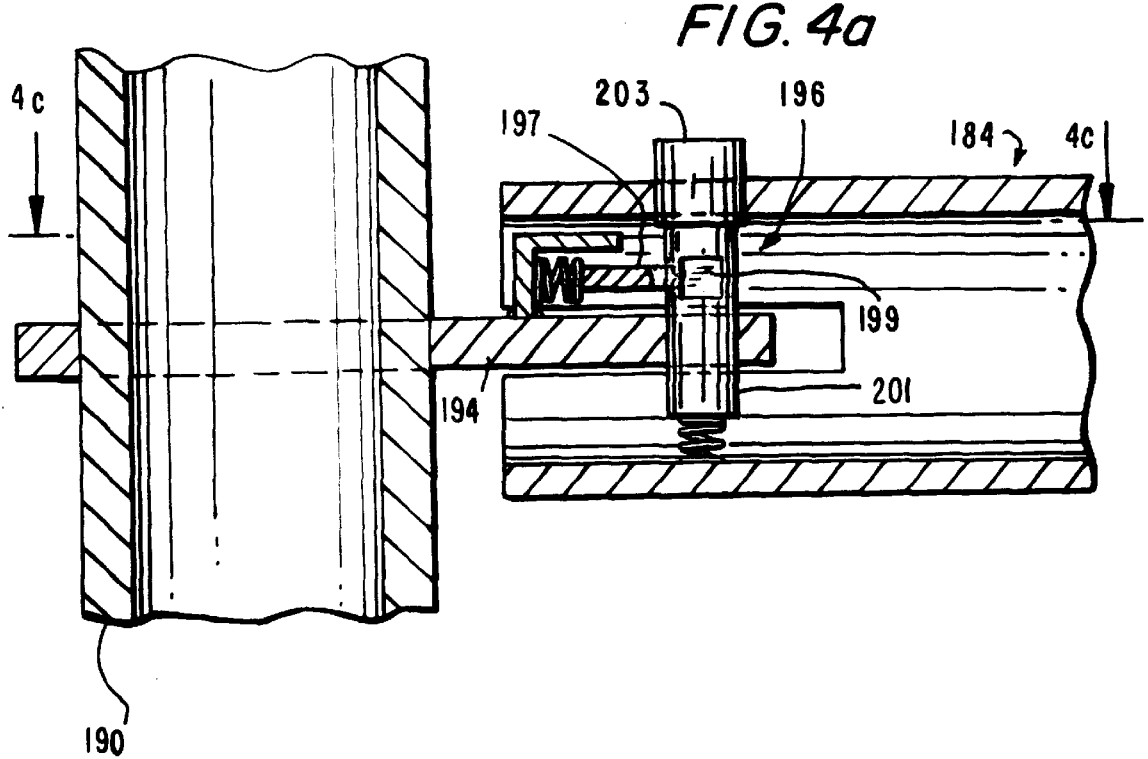
FIG. 4a is a cross-sectional view of a pivot and locking mechanism taken along section lines 4a—4a in FIG. 4.
Figure 4C:
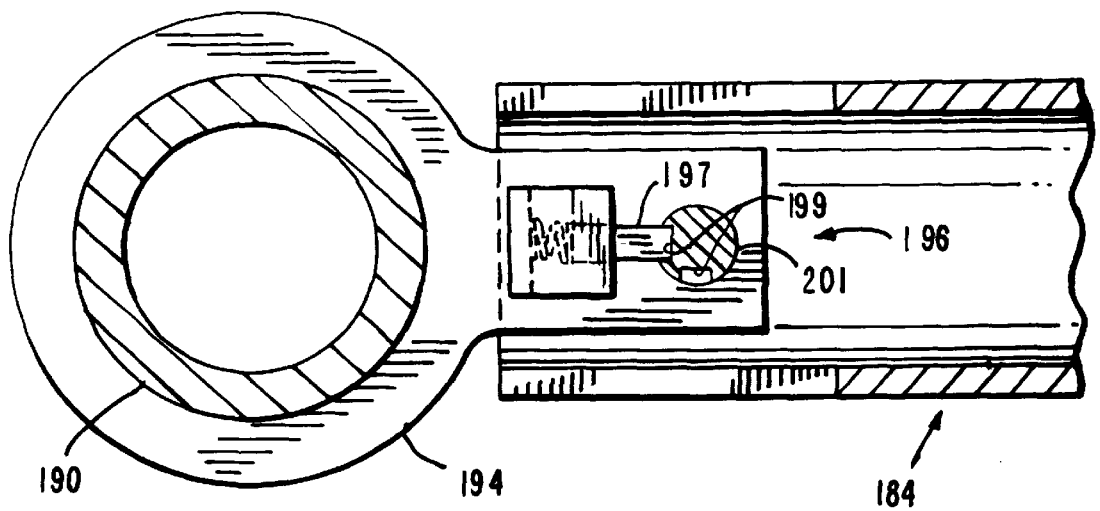

In FIG. 4, a piece of wheeled luggage 150 of a generally parallelepiped shape is shown equipped with a swing out handle structure 180 in accordance with a third embodiment of the invention. The wheeled luggage 150 has a front wall 152, a rear wall 154, a front side wall 156, a rear side wall 158, a bottom wall 160, and a top wall 162, all walls being rectangular in shape. The bottom wall 160 has six wheels attached to three of its four edges. Each of a first pair of wheels 164 is fixedly attached to opposite sides of the edge 170 between the rear wall 154 and the bottom wall 160. Each of a second pair of wheels 166 is fixedly attached to opposite sides of the edge 172 between the front side wall 156 and the bottom wall 160. Finally, each of a third pair of wheels 168 is fixedly attached to opposite ends of the edge 174 between the rear side wall 158 and the bottom wall 160. When the wheeled luggage is at rest in a vertical orientation as shown in FIG. 4, the first pair of wheels 164, the second pair of wheels 166, and the third pair of wheels 168 are in contact with a surface 220.

The handle structure 180 is comprised of a conventional U-shaped telescoping handle 182 well-known in the art and a swing out handle 184. The U-shaped telescoping handle 182 has a padded grip 186 located on the spanning portion 188 of the U-shaped telescoping handle 182 for grasping by a user in extending and contracting the U-shaped telescoping handle 182 and in propelling the wheeled luggage 150 in selected directions. The swing out handle 184 is shown in its substantially horizontal storage position, perpendicular to the twin legs 190 of the U-shaped telescoping handle 182, substantially parallel to and below the spanning portion 188 of the U-shaped telescoping handle 182, and substantially parallel to the longer dimension of the bottom wall 160 of the wheeled luggage 150. The swing out handle 184 comprises a preferably padded bar 192 which is attached to one leg 190 of the U-shaped telescoping handle 182 by an attachment member 194 with an integral end element and a pivot and locking mechanism 196 running through the integral end element of the attachment member 194 and a first end of the padded bar 192. A toroidal portion of the attachment member 194 fits around one of the legs 190 of the U-shaped telescoping handle 182. Instead of the toroidal portion of the attachment member 194, the attachment member 194 may be attached to one of the legs 190 of the U-shaped telescoping handle 182 by a fork-shaped end fitting around one of the legs and a screw or bolt penetrating the leg and the fork and being held in place by a nut or washer. The pivot and locking mechanism 196 allows rotation of the swing out handle 184 from a position substantially parallel to the longer dimension of the bottom wall 160 of the wheeled luggage 150 to an operating position shown in FIG. 4 in dotted lines 198 perpendicular to the longer dimension of the bottom wall 160 of the wheeled luggage 150. The pivot and locking mechanism 196, (see FIG. 4a), produces a locking effect when the swing out handle 184 is in the parallel position and the perpendicular position by, for example, a spring-actuated tongue 197 and grooves 199, the grooves 199 lying in a pin 201 which permits the pivoting needed, or by other conventional means well known in the art. The locked swing out handle 184 can be released by the user by, for example, pushing a button 203 on the swing out handle 184 disengaging the tongue 197 from one of the grooves 199 or by other conventional means well known in the art. Alternatively, the pivot and locking mechanism 196 may be replaced by a pin alone permitting the pivoting needed, but offering sufficient resistance to pivoting to render any locking mechanism unnecessary.

In operation, the user can exert a downward force on the padded grip 186 and tip the wheeled luggage 150 so that only the first pair of wheels 164 remain in contact with the surface 220. In this angled position, the wheeled luggage 150 can be pulled in a first direction 200 or pushed in a second direction 202, assuming that the user is standing on the same side of the wheeled luggage 150 as the rear wall 154. Both the first direction 200 and the second direction 202 are perpendicular to the longer dimension of the bottom wall 160 of the wheeled luggage 150. To propel the wheeled luggage 150 in either a third direction 204 or a fourth direction 206, the user may exert a downward force on any portion of the padded bar 192, thereby tipping the wheeled luggage so that either only the second pair of wheels 166 or only the third pair of wheels 168 remains in contact with the surface 220. The user may then push or pull the wheeled luggage 150 in the third direction 204 and push or pull the wheeled luggage 150 in the fourth direction 206, depending on whether the user is standing on the same side of the wheeled luggage 150 as the front side wall 156 or the rear side wall 158. Both the third direction 204 and the fourth direction 206 are perpendicular to the shorter dimension of the bottom wall 160 of the wheeled luggage 150.

Telescoping handle guide tubes 212 hold the legs 190 of the U-shaped telescoping handle when the handle is fully retracted and guide and hold them upon extension. Each telescoping handle guide tube 212 is contained within a molding 214 preferably integrally formed with the rear wall 154 of the wheeled luggage 150. The front wall 152 of the wheeled luggage 150 is flexible and substantially removable by means of the zipper mechanism 216 running around three of its four edges. The remaining walls of the wheeled luggage are rigid to provide needed strength for the weight of the contents, for forces exerted on the wheeled luggage 150 during wheeling, and for support of the moldings 214 and of the U-shaped telescoping handle 182 contained therein as well as the swing out handle 184.

While preferred embodiments have been described herein, it will be understood by those with ordinary skill in the art that various modifications, changes, or alterations may be made to the invention disclosed and described herein without departing from its scope or its equivalent as claimed in the appended claims.

For example, access to the interior of the wheeled luggage 10 may be obtained through the use of a hinged lid opening from a bottom instead of the zipper mechanism 78 shown. The lid would comprise the front wall 12, the one half of the top wall 22 nearest the front wall 12, the one half of the front side wall 16 nearest the front wall 12, the one half of the bottom wall 20 nearest the front wall 12, and the one half of the rear side wall 18 nearest the front wall 12. The bottom would comprise the rear wall 14 and the portions of the other walls not comprised within the lid. In addition, the wheels on the wheeled luggage 10 may easily be supported from casters attached to the bottom wall 20, similar to the embodiment shown in FIG. 3, instead of from the edges of the bottom wall 20 as shown in FIG. 1.

Moreover, the guide tubes 128, 130 holding the U-shaped telescoping handle 112 and the swing out handles 114 may be relocated so that they penetrate opposite ends of the top wall 92 near the edges of the top wall 92 shared with the front side wall 86 and the rear side wall 88, (see FIG. 3*b*), thus eliminating the need for any molding 132, although the interior storage space of the wheeled luggage 80 will thereby be reduced.

Analogously, access to the interior of the wheeled luggage 150 may be obtained through the use of a hinged lid opening from a bottom instead of the zipper mechanism 216 shown. The lid would comprise the front wall 152, the one half of the top wall 162 nearest the front wall 152, the one half of the front side wall 156 nearest the front wall 152, the one half of the bottom wall 160 nearest the front wall 152, and the one half of the rear side wall 158 nearest the front wall 152. The bottom would comprise the rear wall 154 and the portions of the other walls not comprised within the lid. In addition, the wheels on the wheeled luggage 150 may easily be supported from casters attached to the bottom wall 160, similar to the embodiment shown in FIG. 3, instead of from the edges of the bottom wall 160 as shown in FIG. 4.

Moreover, the guide tubes 212 holding the U-shaped telescoping handle 182 may be relocated so that they penetrate opposite ends of the top wall 162 near the edges of the top wall 162 shared with the front side wall 156 and the rear side wall 158, (see FIG. 4*b*), thus eliminating the need for any molding 214, although the interior storage space of the wheeled luggage 150 will thereby be reduced.

Finally, some of the wheels on the wheeled luggage 10, 80, 150 may be attached to the wheeled luggage 10, 80, 150 so that they swivel, thereby allowing movement of the wheeled luggage in certain directions without tipping the wheeled luggage 10, 80, 150 from a vertical orientation.

Other modifications too numerous to mention will easily occur to one of ordinary skill in the art.

What is claimed is:

1. A handle structure for wheeled luggage comprising:
 a first means for gripping said wheeled luggage, said first means being extendable and retractable from and to at least two separated locations on said wheeled luggage, said first means comprising a plurality of linear members;
 a second means for gripping said wheeled luggage, said second means being extendable and retractable relative to said wheeled luggage without permitting any rotation of said second means relative to said wheeled luggage during at least a portion of said extension and retraction; and
 pivotable attachment means for pivotably attaching said second means for gripping said wheeled luggage to said first means for gripping said wheeled luggage, thereby allowing said second means to pivot relative to said first means;
 wherein said plurality of linear members form a U-shaped telescoping handle.

2. A handle structure for wheeled luggage as claimed in claim 1, wherein said first means for gripping said wheeled luggage is extendable and retractable relative to said wheeled luggage through at least one guide tube.

3. A handle structure for wheeled luggage as claimed in claim 2, wherein said at least one guide tube is contained within at least one molding attached to said wheeled luggage.

4. A handle structure for wheeled luggage as claimed in claim 2, wherein said at least one guide tube is contained within an interior space enclosed by said wheeled luggage.

5. A handle structure for wheeled luggage as claimed in claim 1, wherein said second means for gripping said wheeled luggage is extendable and retractable relative to said wheeled luggage through at least one guide tube.

6. A handle structure for wheeled luggage as claimed in claim 5, wherein said at least one guide tube is contained within at least one molding attached to said wheeled luggage.

7. A handle structure for wheeled luggage as claimed in claim 5, wherein said at least one guide tube is contained within an interior space enclosed by said wheeled luggage.

8. A handle structure for wheeled luggage as claimed in claim 1, wherein said second means for gripping said wheeled luggage comprises two linear members.

9. A handle structure for wheeled luggage as claimed in claim 1, wherein said pivotable attachment means is also lockable.

10. A handle structure for wheeled luggage as claimed in claim 9, wherein said pivotable and lockable attachment means comprises a pin with grooves therein and a tongue capable of engaging within one of said grooves at a given time.

11. A handle structure for wheeled luggage as claimed in claim 10, wherein said pivotable and lockable attachment means further comprises means for releasing said tongue from engagement within one of said grooves.

12. A handle structure for wheeled luggage as claimed in claim 9, wherein said pivotable and lockable attachment means locks said second means into a position perpendicular to a longer dimension of a bottom wall of said wheeled luggage.

13. A handle structure for wheeled luggage as claimed in claim 1, wherein said pivotable attachment means comprises a pin.

14. A handle structure for wheeled luggage as claimed in claim 1, wherein said first means for gripping said wheeled luggage is extendable and retractable relative to said wheeled luggage perpendicularly to a surface with which said wheeled luggage is in contact when all of the wheels on said wheeled luggage are in contact with said surface.

15. A handle structure for wheeled luggage comprising:
a first means for gripping said wheeled luggage, said first means being extendable and retractable from and to at least two separated locations on said wheeled luggage, said first means comprising a plurality of linear members;
a second means for gripping said wheeled luggage, said second means being extendable and retractable relative to said wheeled luggage without permitting any rotation of said second means relative to said wheeled luggage during at least a portion of said extension and retraction; and
pivotable attachment means for pivotably attaching said second means for gripping said wheeled luggage to said first means for gripping said wheeled luggage, thereby allowing said second means to pivot relative to said first means;
wherein said second means for gripping said wheeled luggage comprises a U-shaped telescoping handle.

16. A handle structure for wheeled luggage as claimed in claim 15, wherein said U-shaped telescoping handle has two legs, each leg having a means for gripping said U-shaped telescoping handle at a free end of said leg.

17. A handle structure for wheeled luggage comprising:
a first means for gripping said wheeled luggage, said first means being extendable and retractable from and to at least two separated locations on said wheeled luggage, said first means comprising a plurality of linear members;
a second means for gripping said wheeled luggage, said second means being extendable and retractable relative to said wheeled luggage without permitting any rotation of said second means relative to said wheeled luggage during at least a portion of said extension and retraction; and
pivotable attachment means for pivotably attaching said second means for gripping said wheeled luggage to said first means for gripping said wheeled luggage, thereby allowing said second means to pivot relative to said first means;
wherein said second means for gripping said wheeled luggage comprises two linear members, and each of said two linear members comprises a means for gripping each of said two linear members at a first end and at a second end of each of said two linear members.

18. A handle structure for wheeled luggage comprising:
a first means for gripping said wheeled luggage, said first means being extendable and retractable from and to at least two separated locations on said wheeled luggage, said first means comprising a plurality of linear members; and
a second means for gripping said wheeled luggage attached to said first means at a single end of said second means;
wherein said plurality of linear members form a U-shaped telescoping handle.

19. A handle structure for wheeled luggage as claimed in claim 18, wherein said second means for gripping said wheeled luggage comprises:
a linear member;
an attachment member at said single end of said second means which attaches said linear member to said first means for gripping said wheeled luggage; and
pivotable attachment means for pivotably attaching said linear member to said attachment member, thereby allowing said linear member to pivot relative to said attachment member.

20. A handle structure for wheeled luggage as claimed in claim 19, wherein said pivotable attachment means comprises a pin.

21. A handle structure for wheeled luggage as claimed in claim 19, wherein said pivotable attachment means is also lockable.

22. A handle structure for wheeled luggage as claimed in claim 21, wherein said pivotable and lockable attachment means locks said linear member into a position perpendicular to a longer dimension of a bottom wall of said wheeled luggage.

23. A handle structure for wheeled luggage as claimed in claim 21, wherein said pivotable and lockable attachment means comprises a pin with grooves therein and a tongue capable of engaging within one of said grooves at a given time.

24. A handle structure for wheeled luggage as claimed in claim 23, wherein said pivotable and lockable attachment means further comprises means for releasing said tongue from engagement within one of said grooves.

25. A handle structure for wheeled luggage as claimed in claim 18, wherein said first means for gripping said wheeled luggage is extendable and retractable relative to said wheeled luggage through at least one guide tube.

26. A handle structure for wheeled luggage as claimed in claim 25, wherein said at least one guide tube is contained within at least one molding attached to said wheeled luggage.

27. A handle structure for wheeled luggage as claimed in claim 25, wherein said at least one guide tube is contained within an interior space enclosed by said wheeled luggage.

28. A handle structure for wheeled luggage as claimed in claim 18, wherein said first means for gripping said wheeled luggage is extendable and retractable relative to said wheeled luggage perpendicularly to a surface with which said wheeled luggage is in contact when all of the wheels on said wheeled luggage are in contact with said surface.

29. A method of using a handle structure for wheeled luggage, said handle structure comprising:

a first means for gripping said wheeled luggage, said first means being extendable and retractable from and to at least two separated locations on said wheeled luggage, said first means comprising a plurality of linear members;

a second means for gripping said wheeled luggage, said second means being extendable and retractable relative to said wheeled luggage without permitting any rotation of said second means relative to said wheeled luggage during at least a portion of said extension and retraction; and pivotable attachment means for pivotably attaching said second means for gripping said wheeled luggage to said first means for gripping said wheeled luggage, thereby allowing said second means to pivot relative to said first means;

wherein said plurality of linear members form a U-shaped telescoping handle, said handle structure being used to propel said wheeled luggage, said method comprising a step from the group consisting of:

exerting a force on said first means for gripping said wheeled luggage; and exerting a force on said second means for gripping said wheeled luggage.

30. A method of using a handle structure for wheeled luggage, said handle structure comprising:

a first means for gripping said wheeled luggage, said first means being extendable and retractable from and to at least two separated locations on said wheeled luggage, said first means comprising a plurality of linear members; and a second means for gripping said wheeled luggage attached to said first means at a single end of said second means;

wherein said plurality of linear members form a U-shaped telescoping handle, said handle structure being used to propel said wheeled luggage, said method comprising a step from the group consisting of:

exerting a force on said first means for gripping said wheeled luggage; and exerting a force on said second means for gripping said wheeled luggage.

* * * * *